Sept. 27, 1932.   H. S. MORSE   1,879,989
COMBINED FRUIT CUTTING AND CAN FILLING MACHINE
Filed Jan. 2, 1932    4 Sheets-Sheet 1

INVENTOR
Harry S. Morse
BY
Ritter, Mechlin & O'Neill
ATTORNEYS

Sept. 27, 1932. H. S. MORSE 1,879,989
COMBINED FRUIT CUTTING AND CAN FILLING MACHINE
Filed Jan. 2, 1932 4 Sheets-Sheet 2

INVENTOR
Harry S. Morse
BY
Ritter, Muchlin & O'Neill
ATTORNEYS

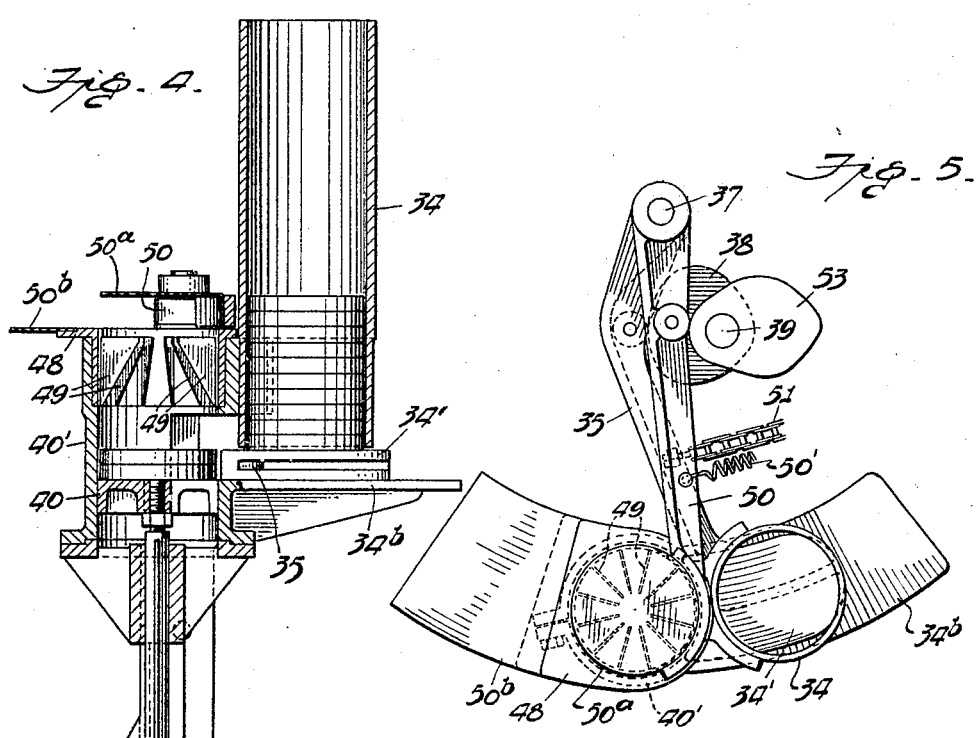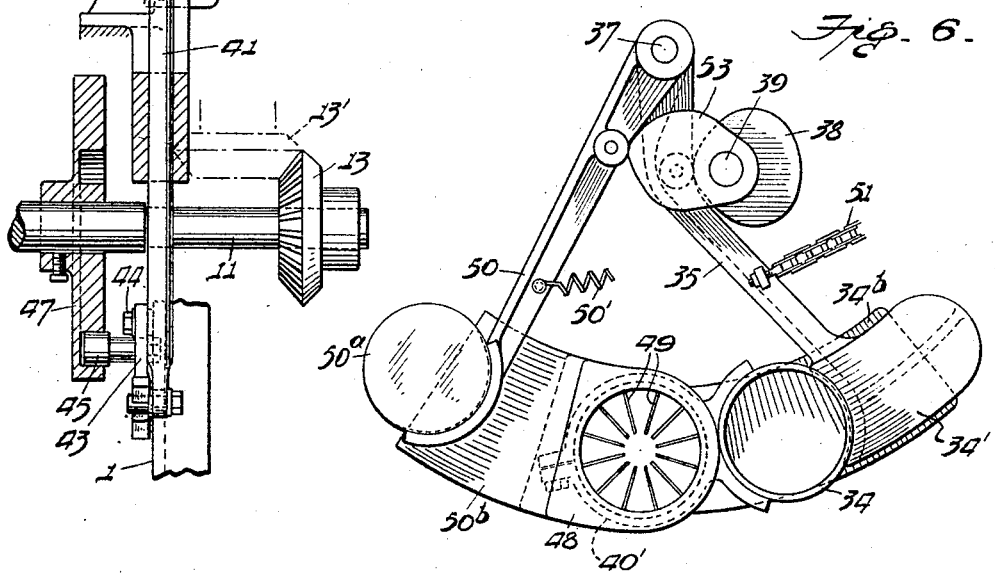

Sept. 27, 1932.    H. S. MORSE    1,879,989
COMBINED FRUIT CUTTING AND CAN FILLING MACHINE
Filed Jan. 2, 1932    4 Sheets-Sheet 4
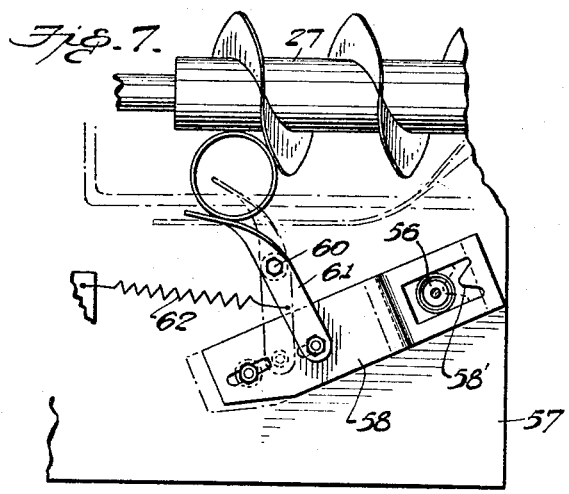
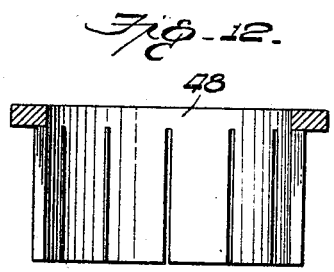
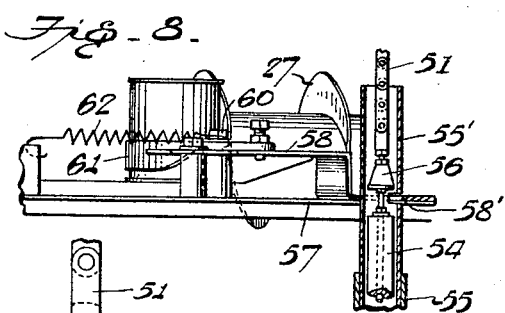
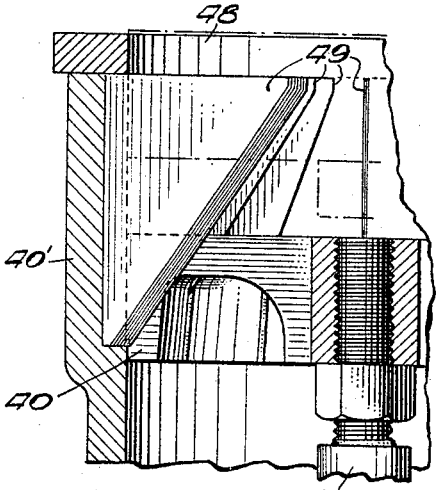
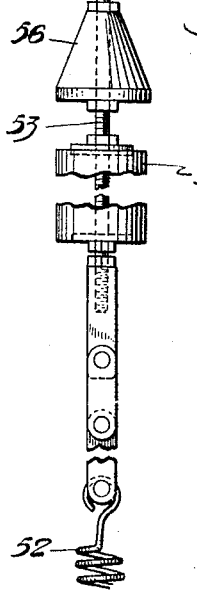
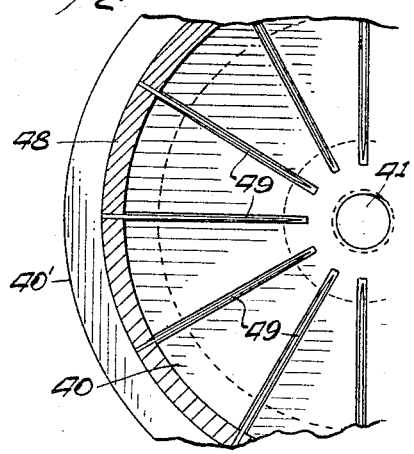
INVENTOR
Harry S. Morse
BY
Ritter, Machlin & O'Neill
ATTORNEYS Patented Sept. 27, 1932

1,879,989

UNITED STATES PATENT OFFICE

HARRY S. MORSE, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF HAWAII

COMBINED FRUIT CUTTING AND CAN FILLING MACHINE

Application filed January 2, 1932. Serial No. 584,535.

The invention relates to a machine for cutting slices of fruit, such as pineapples, into segments and delivering the segments resulting from each cutting operation to a cam filling machine, so that the cans will receive the same number of cut segments or sections, the apparatus including means to stop the delivery of the segments to the filling machine, when the feeding of the empty cans to the machine in regular sequence is interrupted.

The invention is illustrated in the accompanying drawings, in which:—

Fig. 4 is an enlarged sectional elevation of the cutting apparatus and its accessories.

Figs. 5 and 6 are plan views thereof showing the parts in different operative relations.

Fig. 7 is a fragmentary plan view illustrating the automatic stop mechanism.

Fig. 8 is an elevation, partly in section, of the parts illustrated in Fig. 7.

Fig. 9 is an enlarged detail of a portion of the stop device.

Fig. 10 is a fragmentary sectional elevation of the segment cutting mechanism.

Fig. 11 is a fragmentary plan view thereof.

Fig. 12 is a sectional elevation of the knife holder.

Figure 2:
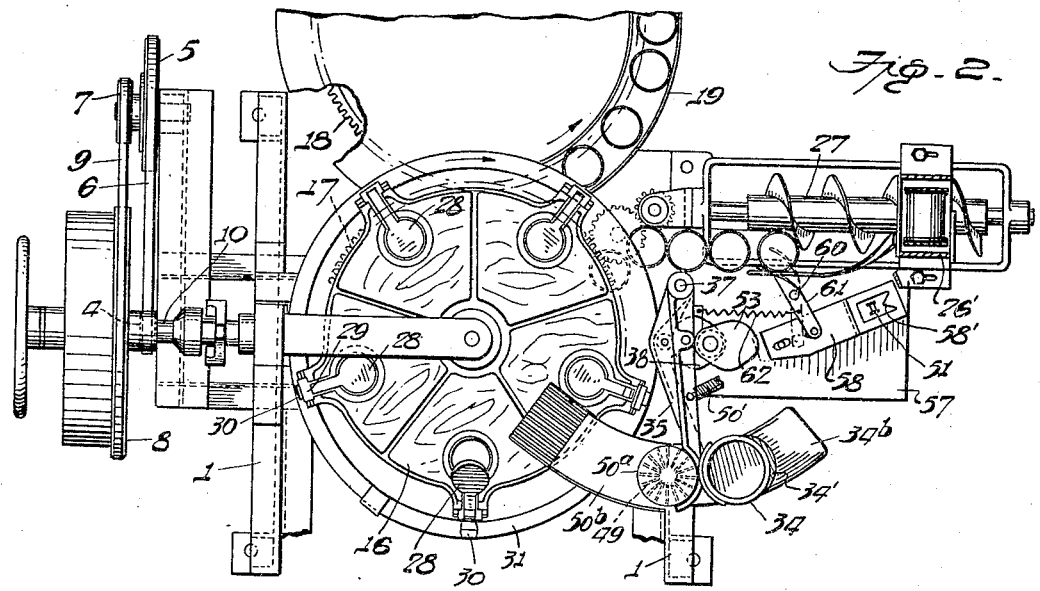
Fig. 2 is a plan view.
Figure 1:
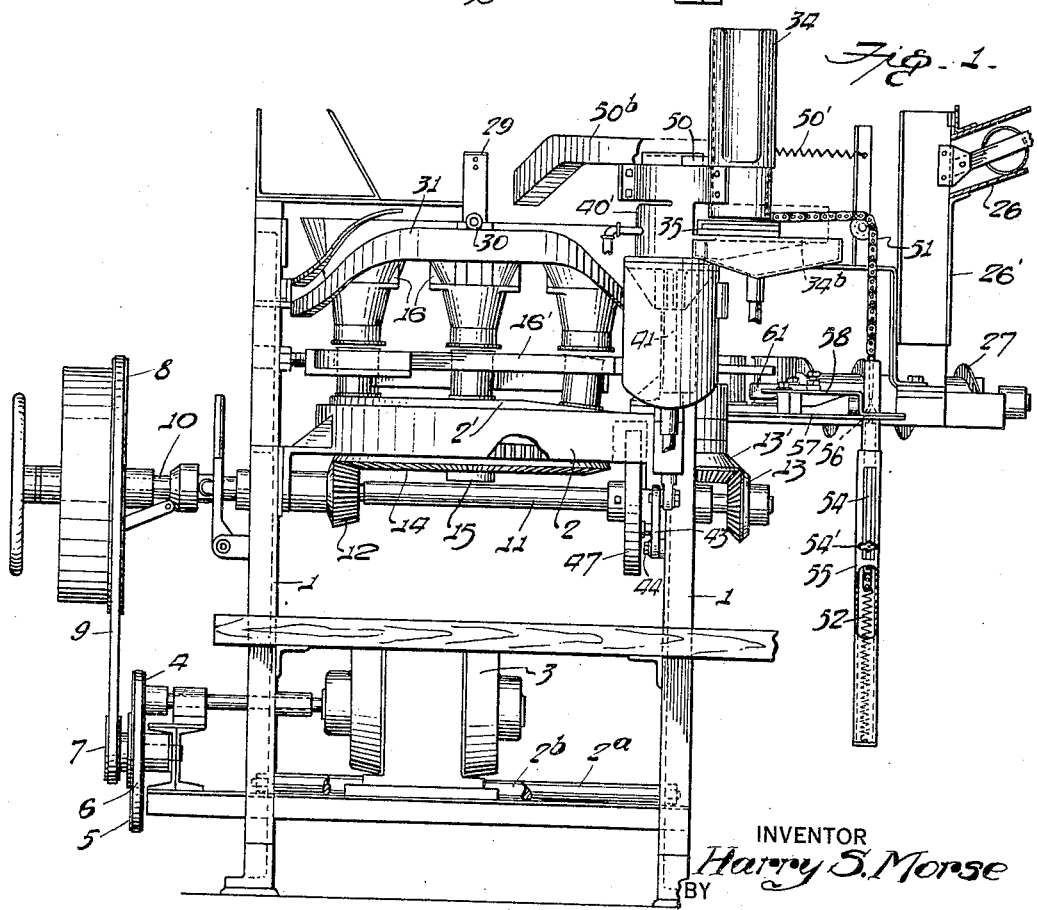
Fig. 1 shows the machine in front elevation.
Figure 13:
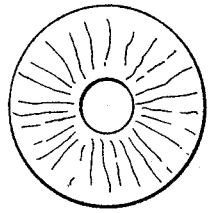
Fig. 13 shows a fruit slice before the cutting operation.
Figure 14:
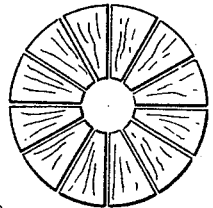
Fig. 14 shows the slice after being cut into segments.

Referring to the drawings, 1 indicates the side members of the machine, which are preferably formed as iron castings and are connected intermediate their height by a tablelike member 2 over which the cans are moved, in circular series, during the filling operation, the lower portions of the frame being connected by cross rods or braces 2ª and 2ᵇ.

Figure 3:
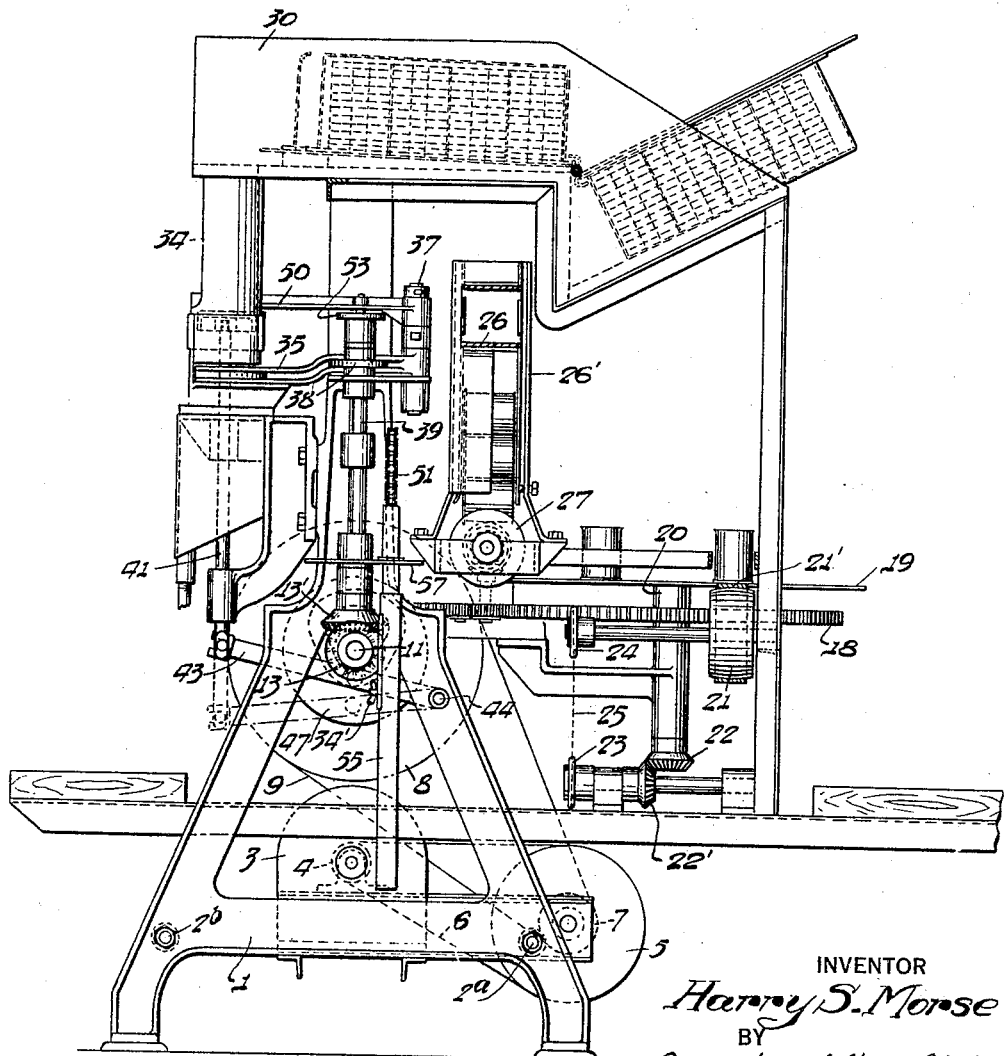
Fig. 3 is a side elevation.

Mounted on the lower part of the frame is an electric motor 3, which drives the main shaft 11, mounted in journals in the side frame members, through sprocket gearing 4, 5 and 6 and sprocket gearing 7, 8 and 9, the driven sprocket 8 being connected to the shaft by clutch 10. Fixed to the main shaft 11 is a bevel gear 12, which engages bevel gear 14 fast to shaft 15, upon which is rigidly mounted a turret 16, provided with multiple hopper-like sections, the bottoms of which are provided with discharge spouts adapted to register with the cans, as the later are moved over the top 2' of the table section 2 by the positioning wheel 16'. Fixed to the shaft 15 is a spur gear 17, which meshes with a spur gear 18, mounted on a laterally disposed shaft 20 to which is secured a discharge table 19, which receives the filled cans from the filling machine and delivers the filled cans to the conveyer belt 21, which is driven from shaft 20 by miter gears 22, 22' and sprocket gearing 23, 24 and 25, as more particularly illustrated in Fig. 3.

Empty cans are fed in regular sequence to the filling machine from an inclined chute 26, thence to a screw conveyer 27, which is operated by gearing driven from the spur gear 17, the cans being delivered to the pockets of the wheel member 16' of the turret 16 in receiving relation beneath the spouts of the individual hopper members of the turret. Each of the hoppers or pockets of the turret is provided with a pivoted stop or closure 28 cooperating with the corresponding discharge spout to open and close the latter, each closure having an inclined guide stem 29 provided with a roller 30, which engages a cam track 31 fixed to the machine frame, said cam track being adapted to lift the closures 28 in regular sequence and permit the contents of the corresponding pockets or hopper sections to be discharged into the cans. As thus far described, the machine is substantially the same as that disclosed in the patent to Ayars No. 1,459,492, of June 19, 1923, with certain of the parts, such as the measuring wheel and the main feed hopper, being omitted. In the normal operation of this machine, the material with which the cans are to be filled is delivered to the separate pockets or hopper sections in predetermined quantities and the cans fed to the turret in sequence, so that, as a given hopper section passes the cam track 31, the closure member 28 is raised to discharge the contents of a particular hopper section into the subjacent can, said closure member being again moved to closed position, as the hopper section moves away from the cam track. The filled cans are then delivered to the discharge table 19, from which they are moved onto the conveyer belt 21.

Associated with the can filling machine, as described, is an apparatus designed to cut slices of fruit, such as pineapples, into segments and to deliver a predetermined number of such segments to each pocket or hopper section of the turret 16, so that each can will receive exactly the same number of fruit segments. As a matter of convenience, the machine is equipped with a stand or table, such as conventionally illustrated at 30 in Fig. 3, to which the sliced fruit in wire basket-like containers, provided with covers, is delivered, each container being inverted on the upper part of the table and the body member of the container swung away from the cover, leaving the stacked fruit on the cover in convenient position to be placed in stacked relation in a cylindrical magazine or hopper 34, disposed at one side and above the filling machine and rigidly secured to the cylinder 40′ of the cutting device, which cylinder is attached to the main machine frame by a suitable bracket. Extending from the side of the cylinder 40′ is a table-like bracket 34$^b$, which is spaced from and below the lower end of the hopper 34 a distance equal to the number of slices of fruit which are to be cut at each operation. As illustrated in the particular machine shown, the distance between the lower end of the hopper 34 and the table 34$^b$ is equal to the thickness of two slices of fruit.

Slidable over the top of the table 34$^b$ is the end of a pivoted pusher arm 35, which is pivoted on an upright pintle 37 secured to the machine frame, the front portion of the said pusher arm being adapted to substantially fill the space between the bottom of the hopper 34 and the table 34$^b$ and force the two lowermost slices of the fruit from the bottom of the stack in the hopper 34 into cutting position. As particularly shown in Figs. 4, 5 and 6, the head or forward end of the pusher arm has an apron-like projection 34′, which serves to close the bottom of the hopper 34 during the operating stroke of the pusher arm, which is moved out of registry with the bottom of the hopper, when the pusher arm is retracted, and permits the stacked fruit slices in the hopper to rest on the surface of the table 34$^b$.

The operative stroke of the pusher arm 35 is effected by a cam 38 mounted on a perpendicular shaft 39, journaled in bearings on the main frame, said shaft being driven continuously by meshing miter gears 13′ and 13 fixed to the ends of shafts 39 and 11, respectively. The return movement of the pusher arm 35 is effected by a spring mechanism associated with a special stop device to prevent feeding of the slices to the cutting mechanism, when the sequence of the feed of the cans to the machine is interrupted, as will be hereinafter described.

The cylinder 40′ of the cutting apparatus is provided with a lateral opening adjacent the lower end of the hopper 34, through which the slices are moved by the pusher arm onto a plunger 40, which is reciprocated, in properly timed relation, within the cylinder 40′. Fitted in the upper portion of the cylinder 40′ is a flanged ring or annulus 48 provided with a series of radially disposed knives 49, which are preferably of the triangular shape illustrated in Figs. 4 and 10. The plunger 40 is formed with radial slots, which clear the knives 49 as the plunger is moved upward during each cutting operation. The plunger 40 is reciprocated, in properly timed relation, by means of rod 41, mounted in suitable guides, which is actuated by the forked end of a rock lever 43 pivoted on stud 44 on one of the side frames, which rock lever carries a roller 45 engaging a cam slot in a disk 47 secured to the main shaft 11, as more particularly shown in Figs. 3 and 4. The cam slot in the disk 47 is given proper shape to cause the pusher head 40 to remain stationary in the upper portion of the cylinder, after each cutting operation, until the cut segments have been removed from the cutting device by a stripper arm to be described.

Pivoted on stud 37 is a stripper arm 50 having an arcuate outer end adapted to sweep over the top of the plunger 40, when the latter is at the upper limit of its stroke and, therefore, flush with the upper edge of the cylinder 40′, said arcuate end being preferably provided with a guard plate 50$^a$, which arrests the cut slices at the end of the operative stroke of the plunger 40. The stripper arm 50 is actuated in its operative stroke by a cam 53 secured to shaft 39, the cam being fashioned to move the stripper arm to discharge the fruit from the cutter at the completion of the cutting stroke of the plunger. The stripper arm is returned to its initial position by spring 50′ secured to said arm and anchored to a fixed part of the machine. The operative stroke of the stripper arm 50 carries the cut slices into a chute 50$^b$, which discharges into the hopper sections of the turret 16 of the can filling machine.

The pusher arm 35 is normally retracted by the spring mechanism comprising a sprocket chain 51 connected to said lever, running over a guide pulley mounted on the machine frame and passing downward into a tubular guide 55'. Interposed in the length of the chain is a conical member 56, which is adjustably connected to a screw rod 53 upon which is mounted a cylindrical weight 54, the lower end of the rod 53 being connected to a final chain section, which latter has secured to its end a helical spring 52, the other end of which is fastened to the bottom of a tube 55, which telescopes with the fixed tube 55' and is adjustable longitudinally thereof to vary the tension of the spring 52, the tubes being locked in adjusted position by a bolt and slot device 54'.

Secured to the machine frame adjacent the screw conveyer, which feeds the empty cans to the filling machine, is a table 57 upon which is slidably mounted a plate 58 having an opening in its forward end through which the guide tube 55' projects, said opening having an inwardly extending tongue 58' formed thereon, which, under conditions hereinafter indicated, is interposed in the path of movement of the conical stop member 56. Pivotally connected to the slide or plate 58 is a rock lever 61, which is pivoted intermediate its ends on a stud 60, the other end of the rock lever being projected normally into the path of movement of the cans being delivered by the screw conveyer 27, the rock lever being moved into this position by spring 62 connected to the rock lever between its pivotal axis and its connection with the slide 58, which latter is also moved by said spring to cause the tongue 58' to be projected in the path of movement of the cone 56. When no cans are being fed or when the regular sequential feed of the cans is interrupted, the rock lever 61 and the slot 58 assume the dotted position indicated in Fig. 7, and, if the pusher arm 35 is in its forward position, as indicated in Fig. 5, it is prevented from returning to its initial position, to effect its next slice feeding operation, by the tongue 58' engaging the stop cone 56 as aforesaid, and the pusher arm will remain in this position so long as the feed of the cans by the screw conveyer is interrupted. This coordination, therefore, involves a stop mechanism, which prevents the return of the pusher arm from its forward stroke whenever the feed of the empty cans is interrupted, so that no cut slices will be fed to the filling machine so long as the regular sequential feed of the empty cans is interrupted. As soon as the normal feed of the cans is resumed, the lever 61 being engaged by the successive cans, is held in the position indicated in full lines in Fig. 7, thereby moving plate 58 to clear the tongue 58' from the path of movement of the stop cone 56, which is so adjusted in the chain as to occupy a position immediately above the table 57, when the pusher arm 35 is at the end of its feeding stroke. It will be noted that the cone 56 is guided in the tube 55' by the cylindrical weight 54, so that the cone will always be in position to be engaged by the tongue 58' of the slide 58, when the empty can feed is interrupted and when the pusher arm is in its extreme feeding position, said tongue 58' operating through a lateral slit in the guide tube 55'.

While the machine has been illustrated as adapted to cut two slices into segments at each operation, it will be apparent that it may be modified to cut any desired number of slices into segments to fill cans of different capacities and, therefore, it will be understood that the illustrated machine is merely exemplary and may be changed or modified, as suggested, to supply larger cans with corresponding larger but equal numbers of cut segments from a larger number of slices fed to the cutter during each operation.

What I claim is:

1. The combination with a can filling machine, of mechanism for cutting slices of fruit into segments and feeding predetermined numbers of said segments to the filling machine; said mechanism including a magazine for holding a stack of slices, a pusher arm for withdrawing a predetermined number of slices from the bottom of the stack, cutting means including radial knives and a plunger for forcing the slices through said radial knives, and a stripper arm for moving the cut segments from the top of the plunger into a delivery chute to the filling machine.

2. The combination as described in claim 1, in which the pusher arm, the stripper arm and the plunger are actuated by cams and the cams are operated in timed relation with one another and with the filling machine.

3. The combination as described in claim 1, including a cylinder in which the plunger operates in the upper portion of which cylinder the radial knives are mounted.

4. A machine for cutting slices of fruit into segments, comprising a magazine for holding a stack of slices, a table below and spaced from said magazine, a cylinder adjacent said magazine having a lateral opening adjacent said table, radial knives extending inwardly from the upper part of said cylinder, a plunger operating in said cylinder having radial slots to pass said knives, a pusher arm movable over the table to force the lower slices from the stack onto the plunger within the cylinder, a stripper arm mounted to swing over the upper open end of said cylinder to discharge the cut slices from the top of the plunger, and rotary timed cams for operating the pusher arm, the stripper arm and the plunger.

5. A machine as described in claim 4, in which the pusher arm is provided with a rearwardly extending apron to close the bottom of the magazine during the feeding stroke of said arm.

6. A machine for cuting slices of fruit into segments, comprising a magazine for holding a stack of slices, a table below and spaced from said magazine, a cylinder adjacent said magazine having a lateral opening adjacent said table, radial knives extending inwardly from the upper part of said cylinder, a plunger operating in said cylinder having radial slots to pass said knives, a pusher arm movable over the table to force the lower slices from the stack onto the plunger within the cylinder, a stripper arm mounted to swing over the upper open end of said cylinder to discharge the cut slices from the top of the plunger, a drive shaft having a cam thereon for operating said plunger, a second shaft geared to the drive shaft, cams on the second shaft adapted to move the pusher arm and the stripper arm in their feeding and discharge strokes, and springs for returning said arms to their initial positions.

7. The combination with a can filling machine including a feed device for delivering empty cans thereto in sequence, of mechanism for cuting slices of fruit into segments, comprising a magazine for holding a stack of slices, a table below and spaced from said magazine, a cylinder adjacent said magazine having a lateral opening adjacent said table, radial knives extending inwardly from the upper part of said cylinder, a plunger operating in said cylinder having radial slots to pass said knives, a pusher arm movable over the table to force the lower slices from the stack onto the plunger within the cylinder, a stripper arm mounted to swing over the upper open end of said cylinder to discharge the cut slices from the top of the plunger to the filling machine, rotary timed cams for operating the pusher arm, the stripper arm and the plunger, and means to prevent the return of the pusher arm to feeding position when the feed of the empty cans is interrupted.

8. A can filling machine including a conveyer for delivering empty cans in sequence thereto, means for delivering the material to be packed to the machine, said means comprising an oscillating pusher arm, a rotary cam for imparting feeding movements to said arm, spring mechanism for retracting said arm, and means for rendering said spring mechanism ineffective comprising a stop for engaging said mechanism, and a spring actuated lever pivoted intermediate its ends having one end normally moving the stop into operative position and its other end normally projected into the path of movement of the cans being fed.

9. A machine as described in claim 8, in which the stop comprises a sliding plate having a tongue adapted to be moved into and out of engagement with the spring mechanism.

10. A machine for filling cans with segments of sliced fruit, comprising a feed hopper, means for cutting a predetermined number of slices into segments at each operation, means for feeding the slices to the cutting means, means for delivering each series of segments to the feed hopper, means for feeding cans to receiving position relative to the hopper, and mechanism normally holding the slice feeding means inoperative and actuated by the cans when fed in uninterrupted series to free said feeding means.

In testimony whereof I affix my signature.

HARRY S. MORSE.